US010741834B2

(12) United States Patent
Zhang et al.

(10) Patent No.: US 10,741,834 B2
(45) Date of Patent: Aug. 11, 2020

(54) POSITIVE ELECTRODE MATERIAL AND LITHIUM-ION BATTERY

(71) Applicant: Ningde Amperex Technology Limited, Ningde, Fujian (CN)

(72) Inventors: Fei Zhang, Fujian (CN); Meng Wang, Fujian (CN); Leimin Xu, Fujian (CN); Qunfeng Wang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 85 days.

(21) Appl. No.: 16/057,810

(22) Filed: Aug. 7, 2018

(65) Prior Publication Data

US 2019/0051893 A1 Feb. 14, 2019

(30) Foreign Application Priority Data

Aug. 8, 2017 (CN) .......................... 2017 1 0669211

(51) Int. Cl.
*H01M 4/131* (2010.01)
*H01M 4/36* (2006.01)
(Continued)

(52) U.S. Cl.
CPC ........... *H01M 4/366* (2013.01); *H01M 4/131* (2013.01); *H01M 4/483* (2013.01); *H01M 4/505* (2013.01);
(Continued)

(58) Field of Classification Search
CPC ...... H01M 4/131; H01M 4/366; H01M 4/483; H01M 4/505; H01M 4/525; H01M 4/62; H01M 2004/028; H01M 10/0525
See application file for complete search history.

(56) References Cited

U.S. PATENT DOCUMENTS

2017/0018767 A1* 1/2017 Park ...................... H01M 2/162

FOREIGN PATENT DOCUMENTS

CN 104143633 A 11/2014

OTHER PUBLICATIONS

Zhaohui Chen et al., Effect of a ZrO2 Coating on the Structure and Electrochemistry of LixCoO2 When Cycled to 4.5 V, Electrochemical and Solid-State Letters, Aug. 2, 2002, pp. A213-A216.
(Continued)

*Primary Examiner* — Brittany L Raymond

(57) ABSTRACT

The examples of the present application provide a positive electrode material and a lithium-ion battery. The positive electrode material comprises: a substrate material; and a coating material formed on at least one part of a surface of the substrate material; the general formula of the substrate material being $Li_xCo_yM_{1-y}O_2$, wherein $1.0 \leq x \leq 1.2$, $0.8 \leq y \leq 1.0$ and M is at least one selected from the group consisting of Mg, Ti, Al, Zr, Ni, Mn; the coating material includes $Y_2O_3$ and at least two selected from the group consisting of $La_2O_3$, $ZrO_2$ and $CeO_2$. The examples of the present application enable the battery prepared by the provided positive electrode material to have a lower storage expansion ratio, a higher capacity retention ratio, and improved cycle performance at a high charge cutoff voltage by the interaction of at least three kinds of oxides.

15 Claims, 2 Drawing Sheets

(51) Int. Cl.
- *H01M 4/48* (2010.01)
- *H01M 4/505* (2010.01)
- *H01M 4/525* (2010.01)
- *H01M 4/62* (2006.01)
- *H01M 10/0525* (2010.01)
- *H01M 4/02* (2006.01)

(52) U.S. Cl.
CPC ............ *H01M 4/525* (2013.01); *H01M 4/62* (2013.01); *H01M 10/0525* (2013.01); *H01M 2004/028* (2013.01)

(56) References Cited

OTHER PUBLICATIONS

Ying Bai et al., Surface Modification of Spinel LiMn2O4 with Y2O3 for Lithium-ion Battery, Advanced Materials Research, Dec. 8, 2011, pp. 1069-1074, vols. 391-392.

George Ting-Kuo Fey et al., Enhanced electrochemical performance and thermal stability of La2O3-coated LiCoO2, Electrochimica Acta, Jun. 15, 2006, pp. 4850-4858, vol. 51, Issue 23.

\* cited by examiner

POSITIVE ELECTRODE MATERIAL AND LITHIUM-ION BATTERY

CROSS REFERENCES TO RELATED APPLICATIONS

This application claims the benefit of Chinese Patent Application No. 201710669211.8 filed on Aug. 8, 2017. The entire contents of the above application are hereby incorporated by reference in their entirety.

FIELD OF THE APPLICATION

The examples of the present application relates to the field of battery, in particular, to a positive electrode material and a lithium-ion battery.

BACKGROUND

At present, the positive electrode material for the commercial lithium-ion battery is mainly lithium cobalt oxide ($LiCoO_2$). The electrochemical performance of $LiCoO_2$ material is relatively stable, the cycle performance is good, the voltage platform is high, and the compatibility with the electrolyte is good. However, $LiCoO_2$ has a low capacity at a lower voltage, for example, 140 mAh/g, and the capacity utilization rate is low. When the charging voltage increased to 4.45-4.6 V, the amount of delithium can be more than 75%. Due to the excessive amount of delithiation, an irreversible transformation of the crystal structure inside occurs in lithium cobalt oxide material, resulting in decay of capacity and cycle performance. In addition, with the increase of element Co releasing from lithium cobalt oxide positive electrode material at a high voltage, the oxygen release of the crystal structure occurs. The oxygen released from $LiCoO_2$ reacts with the electrolyte to generate a large amount of gas, which deteriorates the storage performance of the cell, thereby further deteriorating the overall performance of the cell.

SUMMARY OF THE APPLICATION

In order to overcome the above problems existing in the prior art, some examples of the present application provide a positive electrode material comprising: a substrate material; and a coating material formed on at least one part of the a surface of the substrate material surface; the general formula of the substrate material is $Li_xCo_yM_{1-y}O_2$, wherein $1.0 \leq x \leq 1.2$, $0.8 \leq y \leq 1.0$ and M is at least one selected from the group of consisting of Mg, Ti, Al, Zr, Ni and Mn; the coating material includes $Y_2O_3$ and at least two selected from the group of $La_2O_3$, $ZrO_2$ and $CeO_2$.

In the above positive electrode material, the general formula of the substrate material is $LiCo_yM_{1-y}O_2$, wherein $0.8 \leq y < 1.0$ and M is at least one selected from the group of consisting of Mg, Ti, Al, Zr, Ni.

In the above positive electrode material, a solid solution is arranged between the substrate material and the coating material.

In the above positive electrode material, the content of the element Y in the positive electrode material is 200 to 2000 ppm, the content of the element La in the positive electrode material is 0 to 3000 ppm, the content of the element Ce in the positive electrode material is 0 to 2000 ppm, the content of the element Zr in the positive electrode material is 0 to 2500 ppm.

In the above positive electrode material, the coating material comprises $Y_2O_3$, $La_2O_3$ and $ZrO_2$.

In the above positive electrode material, the content of the element Y in the positive electrode material is 200 to 2000 ppm, the content of the element La in the positive electrode material is 20 to 3000 ppm, the content of the element Zr in the positive electrode material is 20 to 2500 ppm.

In the above positive electrode material, the coating material comprises $Y_2O_3$, $La_2O_3$, $ZrO_2$ and $CeO_2$.

In the above positive electrode material, the coating material comprises $Y_2O_3$, $La_2O_3$ and $ZrO_2$ without $CeO_2$; the content of the element Y in the positive electrode material is 200 to 2000 ppm, the content of the element La in the positive electrode material is 20 to 3000 ppm, the content of the element Zr in the positive electrode material is 20 to 2500 ppm.

In some examples of the present application provide a positive electrode comprising: a positive current collector; and the above described positive electrode material, arranged on the positive current collector.

In some examples of the present application also provide a lithium-ion battery including the above positive electrode.

Examples of the present application use the oxide of the element Y and at least two oxides selected from the group consisting of the oxide of the element La, the oxide of the element Zr and the oxide of the element Ce for coating the core of the substrate material, so that the resulting positive electrode material is stabilized in structure, the irreversible transformation of the crystal structure at a high operation voltage is avoided or alleviated, and the performance degradation caused by a series of side reactions caused by the precipitation of Co element in the positive electrode material is alleviated.

In some examples, the element Y will reduce the oxygen activity on the surface of the substrate material, which stabilizes the surface of the substrate material structure during the cycle, and inhibits the reaction between the electrolyte and the surface active oxygen to improve the stability of the positive electrode material; the element La has an ability for stabilizing the surface of the substrate material structure; the element Zr can suppress the C-axis change during delithiation; the element Ce can form the structure of the surface doped with stable positive electrode material, thereby reducing the storage expansion ratio.

Compared with the positive electrode material that does not contain a coating material or with a coating material containing only one or two oxides thereof, some examples of the present application enable the provided positive electrode material to have a lower storage expansion ratio, a higher capacity retention ratio, no loss of initial capacity by the interaction of at least three kinds of oxides, thereby improving the cycle performance of the positive electrode material at a high charge cutoff voltage.

BRIEF DESCRIPTION OF THE ACCOMPANYING DRAWINGS

DETAILED DESCRIPTION OF THE PREFERRED EXAMPLES

Figure 1:
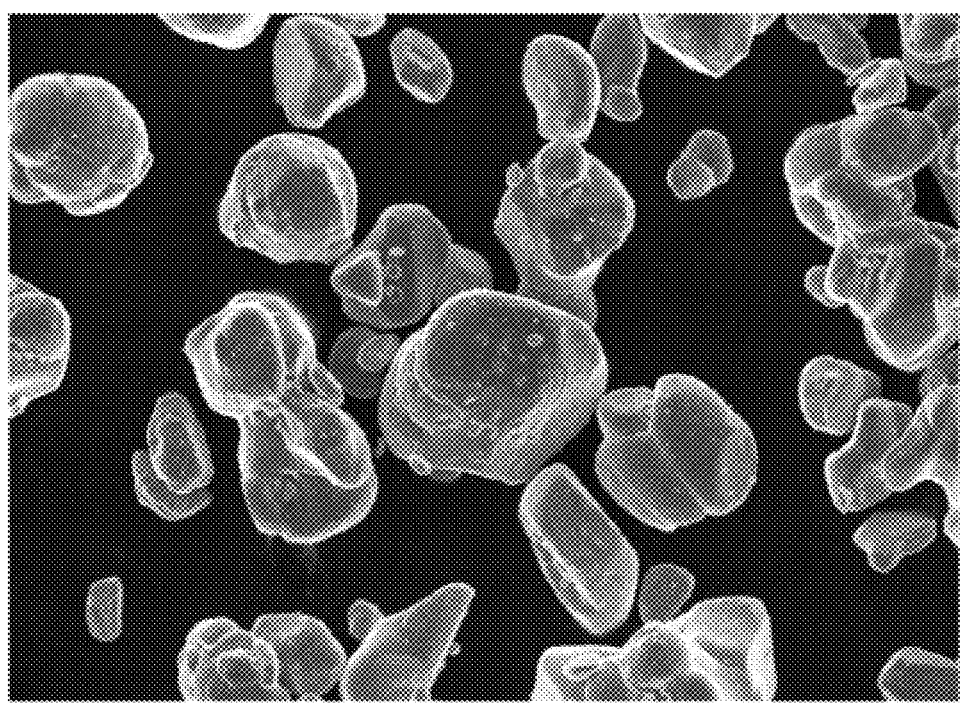
FIG. 1 shows a scanning electron microscope (SEM) image of a positive electrode material at 1000 times magnification according to Example 5 of the present application.

The following examples are provided to enable the skilled person in the art to understand the present application more comprehensively, but do not limit the application in any way.

At a voltage lower than 4.4V, the energy density of $LiCoO_2$ as a positive electrode material is low, only about 140 mAh/g. And when the charging voltage is increased, many problems will occur, for example, the crystal structure of $LiCoO_2$ positive electrode material undergoes irreversible transformation, the increase of Co release amount in the positive electrode material leads to a large amount of release of oxygen from $LiCoO_2$, oxygen released from $LiCoO_2$ will react with the electrolyte to produce a series of side reactions, leading to deterioration of the internal chemical environment of the cell, thereby causing deterioration of battery performance.

The doping of the metal element, the coating of the metal fluoride or the oxide may be performed on the positive electrode material to alleviate the above problems, thereby impairing the degree of damage of the internal structure of the lithium cobalt oxide during the cycle under high voltage conditions. However, the general coating and dopant materials have a limited protection effect on the degree of damage of the internal structure during the circle of lithium cobalt oxide under high voltage operation conditions with the discharge capacity decay rate being fast and the high-temperature cycle performance being basically not improved; on the other hand, as the number of cycles increases, the oxygen release due to the precipitation of internal Co elements leads to deterioration of storage performance, serious gas production, and a worse chemical environment at electrode interface such as an increase in impedance and a greater degree of polarization, thereby further deteriorating the overall performance of the cell.

The inventors of the present application have found that the cycle performance of the cells can be improved by mixing and co-coating the oxides of several elements. Examples of the present application provide a positive electrode material having a long life, a high capacity, and an excellent storage performance at a charge cutoff voltage of 4.45 to 4.6V.

Examples of the present application provide a positive electrode material for a lithium-ion battery, which has a substrate material with a general formula of $Li_xCo_yM_1$-$yO_2$, wherein $1.0 \leq x \leq 1.2$, $0.8 \leq y \leq 1.0$ and M is at least one selected from the group consisting of Mg, Ti, Al, Zr, Ni, Mn; the coating material is mainly a composite of metal oxide $NO_z$ (z is an atomic molar ratio of O to N), the coating layer $NO_z$ is a blend coating material, and N includes Y and at least two selected from the group consisting of Zr, La, and Ce. The skilled person in the art will appreciate that only lithium ion batteries are used herein as examples, and the positive electrode material of the examples of the present application can be used in other related batteries. The coating material achieves the purpose of improving cycle performance and reducing oxygen release of the positive electrode material by suppressing or mitigating changes in the internal structure of the substrate material and precipitation of the element Co at a high voltage.

Since the cell undergoes a very complicated reaction inside when it is operated at a high voltage, the co-coating with the metal oxide can work together to attenuate the degree of side reaction. The working mechanism of these coating materials on the surface of the substrate material is mainly: a protective layer may be formed on the surface of the substrate material to suppress the precipitation of the Co element in the substrate material and suppress the formation of the passivation layer on the surface of the substrate material, thereby facilitating the transmission of Li+; the coating material may form a solid solution with the substrate material on the surface of the substrate material, thereby stabilizing the surface crystal structure of the substrate material and improving the high-temperature cycle thermal stability of the material; the coating material can suppress the changes of C-axis occurring due to an increase in the amount of delithiation during the cycle and suppress irreversible phase transition. The electrical properties of the positive electrode material can be improved by the interaction of various oxides in the coating material.

According to some examples, the coated positive electrode material is prepared by blending at least three metal oxides to coat the substrate material and sintering, wherein the content of the element Y of $Y_2O_3$ in the coated positive electrode material is 200 to 2000 ppm, the content of the element La of $La_2O_3$ in the coated positive electrode material is 0 to 3000 ppm, the content of the element Ce of $CeO_2$ in the coated positive electrode material is 0 to 2000 ppm, and the content of the element Zr of $ZrO_2$ in the coated positive electrode material is 0 to 2500 ppm; the above content ranges of Y, Ce, Zr, and La include the end points, but the content of at most one element selected from the group of Ce, Zr, and La is 0. The coating material comprises $Y_2O_3$ and at least two oxides selected from the group consisting of $La_2O_3$, $CeO_2$ and $ZrO_2$. In some examples the coating material of positive electrode material used in lithium-ion battery are oxides of three elements of La, Y, and Zr, in some examples the contents of La, Y, and Zr in the positive electrode material are 1000 ppm, 1000 ppm, and 500 ppm, respectively.

Figure 2:
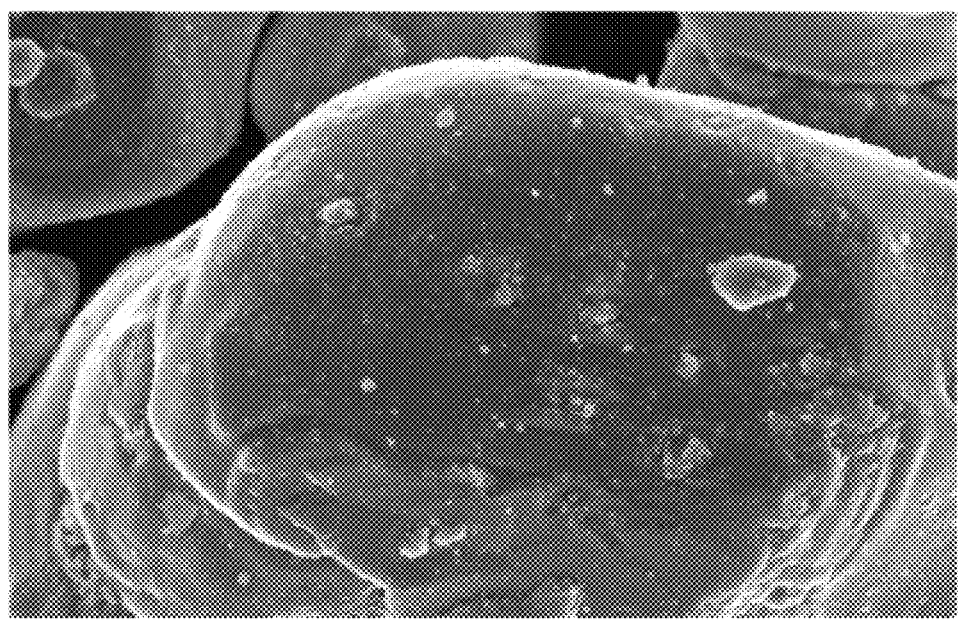
FIG. 2 shows a SEM image of a positive electrode material at 5000 times magnification according to Example 5 of the present application.

The preparation of the positive electrode material will be described below. Blending $Y_2O_3$ and at least two oxides selected from the group consisting of $La_2O_3$, $CeO_2$ and $ZrO_2$ with different ratios, with the substrate material and coated on the substrate material, and the mixture are sintered at 800° C. to 900° C. for 8 to 10 hours to obtain a coated positive electrode material. Specifically, a 5 Kg sample of the substrate material is weighed. The amounts of $La_2O_3$, $Y_2O_3$, $ZrO_2$ and/or $CeO_2$ are calculated and weighed as a coating material according to the corresponding content. Blending and coating are performed with the coating material and the substrate material, and mixed and stirred for 8 to 10 hours by a slant mixer; the uniformly mixed material is placed in a sintering furnace for calcining and sintering, and is heated at a heating rate of 10 to 15° C./min to 800° C. to 900° C. for 7 to 9 hours, and then naturally cools to room temperature; The sintered sample is subjected to crushing and sieving (for example, obtaining a sample having a particle pore size of 2 to 12 μm) to obtain a coated positive electrode material, wherein the coating material is formed on at least one portion of the surface of the substrate material. In some examples, the metal oxide in the coating material is uniformly distributed. FIGS. 1 and 2 show a scanning electron microscope (SEM) image of a coated positive electrode material at different times magnification according to Example 5. It can be seen from FIGS. 1 and 2 that obvious coated particles present at the surface of the substrate material, and there is no agglomeration phenomenon, and the particles are dispersed more uniformly.

The skilled person in the art will appreciate that the above described methods of coating the positive electrode material are merely examples. Other methods commonly used in the art, such as a solvent method, may be employed without departing from the disclosure of the present application.

In some examples of the present application further provide a positive electrode comprising a positive current collector and the above described positive electrode material arranged on the positive current collector. The positive current collector may be, for example, a copper foil and an aluminum foil, however, other positive current collectors commonly used in the art may be employed.

Examples of the present application also provide a lithium-ion battery including above positive electrode.

Examples of the present application also provide a lithium-ion battery comprising a positive electrode, a negative electrode, a separator, an electrolyte, and the like. Among them, the positive electrode material is the coated positive electrode material described above.

The coated positive electrode material described above may be used as a positive electrode material and be prepared into a lithium-ion battery using a common method in the art, wherein the negative electrode material of the lithium-ion battery may be a graphite material, the separator may be a ceramic-coated separator, and the electrolyte may be a $LiPF_6$ electrolyte. The skilled person in the art will appreciate that other negative electrodes, separators, and electrolytes commonly used in the art may be employed. The positive electrode material, the separator, the negative electrode material, and the like are sequentially wound or stacked, and then sealed, for example, in an aluminum plastic film, injection of the electrolyte, forming, sealing and testing. Then, the prepared lithium-ion battery is subjected to a performance test and cycle test.

The skilled person in the art will appreciate that the above described methods for preparing the lithium-ion battery are merely examples. Other methods commonly used in the art may be employed without departing from the disclosure of the present application.

Some specific examples and comparative examples are listed below to better illustrate the application.

Example 1

A 5 Kg sample of $LiCO_2$ is weighed and used as a substrate material. The amount of $La_2O_3$, $Y_2O_3$, $ZrO_2$ is calculated and weighed as a coating material according to the corresponding content. The content of Y of $Y_2O_3$ in the coated positive electrode material is 1000 ppm, the content of the element La of $La_2O_3$ in the coated positive electrode material is 1000 ppm, and the content of the element Zr of $ZrO_2$ in the coated positive electrode material is 500 ppm. The coating material are mixed with $LiCoO_2$ and coated on $LiCoO_2$, and mixed and stirred by a slant mixer for 8 hours; the uniformly mixed material is placed in a sintering furnace for sintering, and is heated at a temperature rising rate of 10° C./min to 800° C. for 8 hours, and then naturally cooled to room temperature; the sintered sample is subjected to crushing and sieving to obtain a coated positive electrode material with an average particle size about 5 μm. The obtained coated positive electrode material is subjected to full cell preparation, and various performances of the battery are measured by a method commonly used in the art, wherein the performance of the lithium-ion battery is measured at a charge cutoff voltage of 4.48 V.

Example 2

The preparation method here is consistent with the preparation method of Example 1, except that the substrate material used in Example 2 is $LiCo_{0.96}Al_{0.04}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 500 ppm.

Example 3

The preparation method here is consistent with the preparation method of Example 1, except that the substrate material used in Example 3 is $LiCo_{0.92}Mg_{0.04}Ti_{0.04}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 500 ppm.

Example 4

The preparation method here is consistent with the preparation method of Example 1, except that the substrate material used in Example 4 is $LiCo_{0.93}Mg_{0.02}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 500 ppm.

Example 5

The preparation method here is consistent with the preparation method of Example 1, except that the substrate material used in Example 5 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 500 ppm.

Example 6

The preparation method here is consistent with the preparation method of Example 1, except that the substrate material used in Example 6 is $LiCo_{0.88}Mg_{0.02}Al_{0.02}Ni_{0.05}Mn_{0.03}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 500 ppm.

Example 7

The preparation method here is consistent with the preparation method of Example 1, except that the substrate material used in Example 7 is $LiCo_{0.80}Mg_{0.03}Al_{0.04}Ni_{0.08}Mn_{0.05}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 500 ppm.

Example 8

The preparation method here is consistent with the preparation method of Example 1, except that the substrate material used in Example 8 is $Li_{1.08}Co_{0.93}Mg_{0.02}Al_{0.02}Mn_{0.03}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 500 ppm.

Example 9

The preparation method here is consistent with the preparation method of Example 1, except that the substrate material used in Example 9 is $Li_{1.2}Co_{0.93}Mg_{0.03}Al_{0.02}Mn_{0.02}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 500 ppm.

Example 10

The preparation method here is consistent with the preparation method of Example 1, except that the substrate material used in Example 10 is $LiCo_{0.92}Mg_{0.03}Al_{0.02}Ti_{0.03}O_2$ and the used coating materials and the content of metal elements in the coating material are as follows: the content of Y of $Y_2O_3$ is 200 ppm, the content of the element La of $La_2O_3$ is 1000 ppm, and the content of the element Zr of $ZrO_2$ is 500 ppm.

Example 11

The preparation method here is consistent with the preparation method of Example 1, except that the substrate material used in Example 11 is $LiCo_{0.92}Mg_{0.03}Al_{0.02}Ti_{0.03}O_2$ and the used coating materials and the content of metal elements in the coating material are as follows: the content of Y of $Y_2O_3$ is 500 ppm, the content of the element La of $La_2O_3$ is 1000 ppm, and the content of the element Zr of $ZrO_2$ is 500 ppm.

Example 12

The preparation method here is consistent with the preparation method of Example 1, except that the substrate material used in Example 12 is $LiCo_{0.92}Mg_{0.03}Al_{0.02}Ti_{0.03}O_2$ and the used coating materials and the content of metal elements in the coating material are as follows: the content of Y of $Y_2O_3$ is 1500 ppm, the content of the element La of $La_2O_3$ is 1000 ppm, and the content of the element Zr of $ZrO_2$ is 500 ppm.

Example 13

The preparation method here is consistent with the preparation method of Example 1, except that the substrate material used in Example 13 is $LiCo_{0.92}Mg_{0.03}Al_{0.02}Ti_{0.03}O_2$ and the used coating materials and the content of metal elements in the coating material are as follows: the content of Y of $Y_2O_3$ is 2000 ppm, the content of the element La of $La_2O_3$ is 1000 ppm, and the content of the element Zr of $ZrO_2$ is 500 ppm.

Example 14

The preparation method here is consistent with the preparation method of Example 1, except that the substrate material used in Example 14 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 20 ppm, and the content of the element Zr of $ZrO_2$ is 500 ppm.

Example 15

The preparation method here is consistent with the preparation method of Example 1, except that the substrate material used in Example 15 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 500 ppm, and the content of the element Zr of $ZrO_2$ is 500 ppm.

Example 16

The preparation method here is consistent with the preparation method of Example 1, except that the substrate material used in Example 16 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1500 ppm, and the content of the element Zr of $ZrO_2$ is 500 ppm.

Example 17

The preparation method here is consistent with the preparation method of Example 1, except that the substrate material used in Example 17 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 2000 ppm, and the content of the element Zr of $ZrO_2$ is 500 ppm.

Example 18

The preparation method here is consistent with the preparation method of Example 1, except that the substrate material used in Example 18 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 3000 ppm, and the content of the element Zr of $ZrO_2$ is 500 ppm.

Example 19

The preparation method here is consistent with the preparation method of Example 1, except that the substrate material used in Example 19 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 20 ppm.

Example 20

The preparation method here is consistent with the preparation method of Example 1, except that the substrate material used in Example 20 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 1000 ppm.

Example 21

The preparation method here is consistent with the preparation method of Example 1, except that the substrate material used in Example 21 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 1500 ppm.

Example 22

The preparation method here is consistent with the preparation method of Example 1, except that the substrate material used in Example 22 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 2000 ppm.

Example 23

The preparation method here is consistent with the preparation method of Example 1, except that the substrate material used in Example 23 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1000 ppm, and the content of the element Zr of $ZrO_2$ is 2500 ppm.

Example 24

The preparation method here is consistent with the preparation method of Example 1, except that the substrate material used in Example 24 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1000 ppm, the content of the element Zr of $ZrO_2$ is 500 ppm and the content of the element Ce of $CeO_2$ is 500 ppm.

Example 25

The preparation method here is consistent with the preparation method of Example 1, except that the substrate material used in Example 25 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1000 ppm, the content of the element Zr of $ZrO_2$ is 500 ppm and the content of the element Ce of $CeO_2$ is 1000 ppm.

Example 26

The preparation method here is consistent with the preparation method of Example 1, except that the substrate material used in Example 26 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1000 ppm, the content of the element Zr of $ZrO_2$ is 500 ppm and the content of the element Ce of $CeO_2$ is 1500 ppm.

Example 27

The preparation method here is consistent with the preparation method of Example 1, except that the substrate material used in Example 27 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1000 ppm, the content of the element Zr of $ZrO_2$ is 500 ppm and the content of the element Ce of $CeO_2$ is 2000 ppm.

Example 28

The preparation method here is consistent with the preparation method of Example 1, except that the substrate material used in Example 28 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element La of $La_2O_3$ is 1000 ppm, and the content of the element Ce of $CeO_2$ is 1500 ppm.

Example 29

The preparation method here is consistent with the preparation method of Example 1, except that the substrate material used in Example 29 is $LiCo_{0.92}Mg_{0.03}Al_{0.02}Ti_{0.03}O_2$ and the used coating materials and the content of metal elements in the coating material are as follows: the content of Y of $Y_2O_3$ is 1000 ppm, the content of the element Zr of $ZrO_2$ is 500 ppm, and the content of the element Ce of $CeO_2$ is 1500 ppm.

Comparative Example 1

The preparation method here is consistent with the preparation method of Example 1, except that the internal core for the substrate material $LiCoO_2$ used in Comparative Example 1 is not coated.

Comparative Example 2

The preparation method here is consistent with the preparation method of Example 1, except that the internal core for the substrate material $LiCo_{0.92}Mg_{0.03}Al_{0.02}Ti_{0.03}O_2$ used in Comparative Example 2 is not coated.

Comparative Example 3

The preparation method here is consistent with the preparation method of Example 1, except that the substrate material used in Comparative Example 3 is $LiCo_{0.92}Mg_{0.03}Al_{0.02}Ti_{0.03}O_2$ and the used coating materials and the content thereof are as follows: the content of Y of $Y_2O_3$ is 1000 ppm.

Comparative Example 4

The preparation method here is consistent with the preparation method of Example 1, except that the used substrate material in Comparative Example 4 is $LiCo_{0.92}Mg_{0.03}Al_{0.02}Ti_{0.03}O_2$ and the used coating materials and the content thereof are as follows: the content of Y of $Y_2O_3$ is 1000 ppm and the content of La of $La_2O_3$ is 1000 ppm.

Comparative Example 5

The preparation method here is consistent with the preparation method of Example 1, except that the used substrate material in Comparative Example 5 is $LiCo_{0.92}Mg_{0.03}Al_{0.02}Ti_{0.03}O_2$ and the used coating materials and the content thereof are as follows: the content of Y of $Y_2O_3$ is 1000 ppm and the content of Zr of $ZrO_2$ is 1000 ppm.

Comparative Example 6

The preparation method here is consistent with the preparation method of Example 1, except that the used substrate material in Comparative Example 6 is $LiCo_{0.92}Mg_{0.03}Al_{0.02}Ti_{0.03}O_2$ and the used coating materials and the content thereof are as follows: the content of Y of $Y_2O_3$ is 1000 ppm and the content of the element Ce of $CeO_2$ is 1000 ppm.

Comparative Example 7

The preparation method here is consistent with the preparation method of Example 1, except that the used substrate material in Comparative Example 7 is $LiCo_{0.92}Mg_{0.03}Al_{0.02}Ti_{0.03}O_2$ and the used coating materials and the content thereof are as follows: the content of La of $La_2O_3$ is 1000 ppm and the content of the element Zr of $ZrO_2$ is 1000 ppm.

The measurement results of the respective examples and comparative examples are shown in Table 1 below. For convenience of comparison, the results of Table 1 are shown in several groups, and the results of Example 5 are shown in different groups.

TABLE 1

| | Parameters of examples and comparative examples | | | | | | Battery performance | | | | |
|---|---|---|---|---|---|---|---|---|---|---|---|
| | Substrate material | Y (ppm) | La (ppm) | Zr (ppm) | Ce (ppm) | Charge cut-off voltage (V) | Charge capacity (mAh/g) | Discharge capacity (mAh/g) | First efficiency | Expansion rate Storage 18 D at 60° C. | Capacity retention rate (25° C., 500 cycles) |
| Examples | | | | | | | | | | | |
| 1 | $LiCoO_2$ | 1000 | 1000 | 500 | 0 | 4.48 | 207.3 | 190.2 | 92.6% | 40.6% | 92.0% |
| 2 | $LiCo_{0.96}Al_{0.04}O_2$ | 1000 | 1000 | 500 | 0 | 4.48 | 206.5 | 189.8 | 92.3% | 37.1% | 93.0% |
| 3 | $LiCo_{0.92}Mg_{0.04}Ti_{0.04}O_2$ | 1000 | 1000 | 500 | 0 | 4.48 | 207.7 | 191.0 | 92.8% | 35.3% | 93.5% |
| 4 | $LiCo_{0.93}Mg_{0.02}Al_{0.02}Ti_{0.03}O_2$ | 1000 | 1000 | 500 | 0 | 4.48 | 207.5 | 190.7 | 92.6% | 33.2% | 94.0% |
| 5 | $LiCo_{0.92}Mg_{0.03}Al_{0.02}Ti_{0.03}O_2$ | 1000 | 1000 | 500 | 0 | 4.48 | 207.3 | 190.5 | 92.4% | 30.0% | 95.0% |
| 6 | $LiCo_{0.88}Mg_{0.02}Al_{0.02}Ni_{0.05}Mn_{0.03}O_2$ | 1000 | 1000 | 500 | 0 | 4.48 | 207.1 | 189.3 | 92.4% | 32.5% | 92.6% |
| 7 | $LiCo_{0.80}Mg_{0.03}Al_{0.04}Ni_{0.08}Mn_{0.05}O_2$ | 1000 | 1000 | 500 | 0 | 4.48 | 207.5 | 190.1 | 91.9% | 35.1% | 93.0% |
| 8 | $Li_{1.08}Co_{0.93}Mg_{0.02}Al_{0.02}Mn_{0.03}O_2$ | 1000 | 1000 | 500 | 0 | 4.48 | 206.8 | 190.5 | 92.8% | 34.1% | 92.3% |
| 9 | $Li_{1.2}Co_{0.93}Mg_{0.03}Al_{0.02}Mn_{0.02}O_2$ | 1000 | 1000 | 500 | 0 | 4.48 | 206.9 | 190.4 | 92.8% | 32.3% | 93.2% |
| 10 | $LiCo_{0.92}Mg_{0.03}Al_{0.02}Ti_{0.03}O_2$ | 200 | 1000 | 500 | 0 | 4.48 | 208 | 191.1 | 92.1% | 50.2% | 83.0% |
| 11 | $LiCo_{0.92}Mg_{0.03}Al_{0.02}Ti_{0.03}O_2$ | 500 | 1000 | 500 | 0 | 4.48 | 207.0 | 190.1 | 92.4% | 55.6% | 85.1% |
| 5 | $LiCo_{0.92}Mg_{0.03}Al_{0.02}Ti_{0.03}O_2$ | 1000 | 1000 | 500 | 0 | 4.48 | 207.3 | 190.5 | 92.4% | 30.0% | 95.0% |
| 12 | $LiCo_{0.92}Mg_{0.03}Al_{0.02}Ti_{0.03}O_2$ | 1500 | 1000 | 500 | 0 | 4.48 | 206.8 | 190.2 | 92.4% | 49.8% | 91.2% |
| 13 | $LiCo_{0.92}Mg_{0.03}Al_{0.02}Ti_{0.03}O_2$ | 2000 | 1000 | 500 | 0 | 4.48 | 206.9 | 190.5 | 92.8% | 40.1% | 92.5% |
| 14 | $LiCo_{0.92}Mg_{0.03}Al_{0.02}Ti_{0.03}O_2$ | 1000 | 20 | 500 | 0 | 4.48 | 205.7 | 189.3 | 92.0% | 56.3% | 92.3% |
| 15 | $LiCo_{0.92}Mg_{0.03}Al_{0.02}Ti_{0.03}O_2$ | 1000 | 500 | 500 | 0 | 4.48 | 205.9 | 189.0 | 92.1% | 55.9% | 92.1% |
| 5 | $LiCo_{0.92}Mg_{0.03}Al_{0.02}Ti_{0.03}O_2$ | 1000 | 1000 | 500 | 0 | 4.48 | 207.3 | 190.3 | 92.4% | 30.0% | 95.0% |
| 16 | $LiCo_{0.92}Mg_{0.03}Al_{0.02}Ti_{0.03}O_2$ | 1000 | 1500 | 500 | 0 | 4.48 | 206.0 | 190.1 | 92.3% | 45.2% | 87.2% |
| 17 | $LiCo_{0.92}Mg_{0.03}Al_{0.02}Ti_{0.03}O_2$ | 1000 | 2000 | 500 | 0 | 4.48 | 206.2 | 190.6 | 92.2% | 50.0% | 85.1% |
| 18 | $LiCo_{0.92}Mg_{0.03}Al_{0.02}Ti_{0.03}O_2$ | 1000 | 3000 | 500 | 0 | 4.48 | 206.1 | 190.3 | 92.0% | 40.3% | 84.8% |
| 19 | $LiCo_{0.92}Mg_{0.03}Al_{0.02}Ti_{0.03}O_2$ | 1000 | 1000 | 20 | 0 | 4.48 | 206.5 | 189.2 | 91.6% | 36.3% | 92.2% |
| 5 | $LiCo_{0.92}Mg_{0.03}Al_{0.02}Ti_{0.03}O_2$ | 1000 | 1000 | 500 | 0 | 4.48 | 207.3 | 190.3 | 92.4% | 30.0% | 95.0% |
| 20 | $LiCo_{0.92}Mg_{0.03}Al_{0.02}Ti_{0.03}O_2$ | 1000 | 1000 | 1000 | 0 | 4.48 | 205.0 | 189.0 | 92.1% | 31.2% | 91.2% |
| 21 | $LiCo_{0.92}Mg_{0.03}Al_{0.02}Ti_{0.03}O_2$ | 1000 | 1000 | 1500 | 0 | 4.48 | 205.6 | 188.7 | 92.0% | 37.9% | 92.1% |
| 22 | $LiCo_{0.92}Mg_{0.03}Al_{0.02}Ti_{0.03}O_2$ | 1000 | 1000 | 2000 | 0 | 4.48 | 206.1 | 187.0 | 93.0% | 33.0% | 90.5% |
| 23 | $LiCo_{0.92}Mg_{0.03}Al_{0.02}Ti_{0.03}O_2$ | 1000 | 1000 | 2500 | 0 | 4.48 | 206.9 | 187.0 | 92.1% | 30.6% | 91.1% |
| 5 | $LiCo_{0.92}Mg_{0.03}Al_{0.02}Ti_{0.03}O_2$ | 1000 | 1000 | 500 | 0 | 4.48 | 207.3 | 190.3 | 92.4% | 30.0% | 95.0% |
| 24 | $LiCo_{0.92}Mg_{0.03}Al_{0.02}Ti_{0.03}O_2$ | 1000 | 1000 | 500 | 500 | 4.48 | 207.1 | 190.2 | 92.0% | 28.8% | 95.9% |
| 25 | $LiCo_{0.92}Mg_{0.03}Al_{0.02}Ti_{0.03}O_2$ | 1000 | 1000 | 500 | 1000 | 4.48 | 206.8 | 190.3 | 92.3% | 44.0% | 91.2% |
| 26 | $LiCo_{0.92}Mg_{0.03}Al_{0.02}Ti_{0.03}O_2$ | 1000 | 1000 | 500 | 1500 | 4.48 | 206.9 | 190.3 | 92.3% | 31.6% | 89.3% |
| 27 | $LiCo_{0.92}Mg_{0.03}Al_{0.02}Ti_{0.03}O_2$ | 1000 | 1000 | 500 | 2000 | 4.48 | 207.1 | 190.3 | 92.5% | 33.0% | 88.2% |
| 28 | $LiCo_{0.92}Mg_{0.03}Al_{0.02}Ti_{0.03}O_2$ | 1000 | 1000 | 0 | 1500 | 4.48 | 206.3 | 190.3 | 92.3% | 53.0% | 86.4% |
| 29 | $LiCo_{0.92}Mg_{0.03}Al_{0.02}Ti_{0.03}O_2$ | 1000 | 0 | 500 | 1500 | 4.48 | 207.2 | 190.2 | 92.5% | 40.1% | 83.0% |
| Comparative Examples | | | | | | | | | | | |
| 1 | $LiCoO_2$ | / | / | / | / | 4.48 | 206.1 | 190.3 | 92.2% | >100% | <80% |
| 2 | $LiCo_{0.92}Mg_{0.03}Al_{0.02}Ti_{0.03}O_2$ | / | / | / | / | 4.48 | 206.3 | 190.5 | 92.9% | >100% | <80% |
| 3 | $LiCo_{0.92}Mg_{0.03}Al_{0.02}Ti_{0.03}O_2$ | 1000 | / | / | / | 4.48 | 207.8 | 190.2 | 92.0% | >100% | 83.3% |
| 4 | $LiCo_{0.92}Mg_{0.03}Al_{0.02}Ti_{0.03}O_2$ | 1000 | 1000 | / | / | 4.48 | 205.3 | 190.4 | 92.8% | 60.0% | 86.6% |
| 5 | $LiCo_{0.92}Mg_{0.03}Al_{0.02}Ti_{0.03}O_2$ | 1000 | / | 1000 | / | 4.48 | 206.9 | 190.2 | 92.1% | 94.1% | 85.1% |
| 6 | $LiCo_{0.92}Mg_{0.03}Al_{0.02}Ti_{0.03}O_2$ | 1000 | / | / | 1000 | 4.48 | 206.1 | 190.1 | 92.7% | 89.2% | 86.2% |
| 7 | $LiCo_{0.92}Mg_{0.03}Al_{0.02}Ti_{0.03}O_2$ | / | 1000 | 1000 | / | 4.48 | 207.1 | 190.3 | 92.7% | 68.0% | 85.3% |

As Table 1 shows, according to Examples 1 to 9, by determining the contents of Y, La and Zr and changing the substrate material, it is found that when the substrate material is $LiCo_{0.92}Mg_{0.03}Al_{0.02}Ti_{0.03}O_2$, the cycle performance is the best and the expansion ratio is small, the capacity retention rate is high and the capacity is normal. Therefore, when the substrate material is $LiCo_{0.92}Mg_{0.03}Al_{0.02}Ti_{0.03}O_2$, the performance of the lithium-ion battery is optimal.

By comparing the results of Example 1 with the results of Comparative Example 1 (the lithium cobalt oxide substrate material is not coated), it is can be found that the battery prepared by the positive electrode material of the examples of the present application has a significantly reduced storage expansion ratio at 60° C. while having a greatly improved capacity retention rate and an improved cycle effect of the lithium-ion battery, wherein the positive electrode material comprises a substrate material coated with $Y_2O_3$, $La_2O_3$ and $ZrO_2$. This is because the $Y_2O_3$, $La_2O_3$ and $ZrO_2$ coatings which stabilize the structure of the positive electrode material, avoid or alleviate the irreversible transformation of the crystal structure at high operation voltage, and alleviate the degradation of performance due to a series of side reactions caused by the precipitation of Co element in the positive electrode material.

By comparing the results of Example 5 with the results of Comparative Examples 2-7 (the lithium cobalt oxide positive substrate material is not coated or coated with only one or two materials therein), it can be found that the battery prepared by the positive electrode material of the examples of the present application has a significantly reduced storage expansion ratio at 60° C. while having a greatly improved capacity retention rate and an improved cycle effect of the lithium-ion battery, wherein the positive electrode material comprises a substrate material coated with $Y_2O_3$, $La_2O_3$ and $ZrO_2$. This is may be the substrate material with coated material which is mixture of the oxide of the element Y, the oxide of the element La, and the oxide of the element Zr, the resulting positive electrode material structure is stabilized by the synergistic action of these metal oxides.

According to some examples, by determining the content of the La and Zr and changing the content of Y, it is found that when the coating content of Y is 1000 ppm, the cycle performance is optimal, the expansion ratio is small, the capacity retention rate is high, and the capacity is normal. This is because the Y element lowers the oxygen activity on the surface of the substrate material to enhance its structural stability and achieve an effect of improving cycle performance. By comparing the results of Examples 10-13 with the results of Comparative Examples 2-7 (the lithium cobalt oxide positive substrate material is not coated or coated with only one or two materials therein), it is found that the battery prepared by the positive electrode material of the examples of the present application has a significantly reduced storage expansion ratio at 60° C. while having a greatly improved capacity retention rate and an improved cycle effect of the lithium-ion battery, wherein the positive electrode material comprises a substrate material coated with $Y_2O_3$, $La_2O_3$ and $ZrO_2$.

According to some examples, in the case where the Y content and the Zr content are determined, it is found that by adjusting the content of the La element, the storage effect is optimal when the coating amount of La is 1000 ppm without affecting the performance of the capacity. La has an ability of stabilizing the surface structure to enhance the thermal stability and cycle performance of the material. By comparing the results of Examples 14-18 with the results of Comparative Examples 2-7 (the lithium cobalt oxide positive substrate material is not coated or coated with only one or two materials therein), it is found that the battery prepared by the positive electrode material of the examples of the present application has a significantly reduced storage expansion ratio at 60° C. while having a greatly improved capacity retention rate and an improved cycle effect of the lithium-ion battery, wherein the positive electrode material comprises a substrate material coated with $Y_2O_3$, $La_2O_3$ and $ZrO_2$.

According to some examples, after determining the content of Y and La, it is found by adjusting the Zr content that when the coating amount of Zr is 500 ppm, the capacity of the Zr is not affected, because after the coating of Zr, the C-axis change during the delithiation process may be suppressed to reduce the interlayer spacing expansion ratio in the crystal grains and realize the effect of stabilizing the structure, and the lower coating amount of the Zr element does not affect the capacity of the substrate material. By comparing the results of Examples 19-23 with the results of Comparative Examples 2-7 (the lithium cobalt oxide positive substrate material is not coated or coated with only one or two materials therein), it is found that the battery prepared by the positive electrode material of the examples of the present application has a significantly reduced storage expansion ratio at 60° C. while having a greatly improved capacity retention rate and an improved cycle effect of the lithium-ion battery, wherein the positive electrode material comprises a substrate material coated with $Y_2O_3$, $La_2O_3$ and $ZrO_2$.

According to some examples, in the case where the coating amount of La/Y/Zr is determined, it can be found that the storage property of the material may be improved after adding $CeO_2$ in coating material, because the coated material with element Ce can stabilize the surface structure of substrate material, and the element Ce is formed a solid solution on the surface of the substrate material particles, then achieving a function of lower storage expansion ratio. In addition, comparing the results of Examples 24-27 with the results of Comparative Examples 2-7 (the lithium cobalt oxide positive substrate material is not coated or coated with only one or two materials therein), it is found that the battery prepared by the positive electrode material of the examples of the present application has a significantly reduced storage expansion ratio at 60° C. while having a greatly improved capacity retention rate and an improved cycle effect of the lithium-ion battery, wherein the positive electrode material comprises a substrate material coated with $Y_2O_3$, $La_2O_3$ and $ZrO_2$. Furthermore, by comparing the results of Examples 28-29 with the results of Comparative Examples 2-7 (the lithium cobalt oxide positive substrate material is not coated or coated with only one or two materials therein), it is understood that Examples 28-29 of the present application have a lower storage expansion ratio and a higher capacity retention ratio.

As can be seen from Table 1, the cycle performance of the coated positive electrode material provided by the examples of the present application is greatly improved, and the discharge capacity is about 190 mAh/g at a high charge cutoff voltage of, for example, about 4.48 V, and the capacity/cycle capacity is not reduced compared to the uncoated substrate material, indicating that the coating material does not deteriorate the capacity. Moreover, at a high charge cut-off voltage of, for example, 4.48 V, the storage expansion ratio of the coated positive electrode material is significantly lowered, and the cycle capacity retention rate is remarkably improved, that is, the storage performance is also greatly improved. So it is shown that even at a high charge cutoff voltage, the coating material of the examples of the present application is also effective in improving the storage performance.

In addition, after the positive electrode material prepared in Example 5 of the present application is observed under a scanning electron microscope (SEM) image at different magnifications, it can be seen from FIGS. 1 (1000×) and 2 (5000×) that the surface of the substrate material has obvious coated particles, and there is no agglomeration phenomenon, and the particles are dispersed more uniformly.

The skilled person in the art will appreciate that the above-described examples are merely exemplary examples, and various changes, substitutions and changes may be made without departing from the spirit and scope of the present application.

What is claimed is:

1. A positive electrode material, comprising:
   a substrate material; and
   a coating material formed on at least one part of a surface of the substrate material;
   the general formula of the substrate material being $Li_xCo_yM_{1-y}O_2$, wherein $1.0 \leq x \leq 1.2$, $0.8 \leq y \leq 1.0$ and M is at least one selected from the group consisting of Mg, Ti, Al, Zr, Ni, Mn;
   the coating material includes $Y_2O_3$ and at least two selected from the group consisting of $La_2O_3$, $ZrO_2$ and $CeO_2$,
   wherein a solid solution is arranged between the substrate material and the coating material.

2. The positive electrode material according to claim 1, wherein the general formula of the substrate material is $LiCo_yM_{1-y}O_2$, wherein $0.8 \leq y \leq 1.0$ and M is at least one selected from the group consisting of Mg, Ti, Al, Zr and Ni.

3. The positive electrode material according to claim 1, wherein the content of the element Y in the positive electrode material is 200 to 2000 ppm; the content of the element La in the positive electrode material is 0 to 3000 ppm; the content of the element Ce in the positive electrode material is 0 to 2000 ppm; the content of the element Zr in the positive electrode material is 0 to 2500 ppm.

4. The positive electrode material according to claim 1, wherein the coating material comprises $Y_2O_3$, $La_2O_3$ and $ZrO_2$.

5. The positive electrode material according to claim 4, wherein the content of the element Y in the positive electrode material is 200 to 2000 ppm, the content of the element La in the positive electrode material is 20 to 3000 ppm, the content of the element Zr in the positive electrode material is 20 to 2500 ppm.

6. The positive electrode material according to claim 1, wherein the coating material comprises $Y_2O_3$, $La_2O_3$, $ZrO_2$ and $CeO_2$.

7. The positive electrode material according to claim 1, wherein the coating material comprises $Y_2O_3$, $La_2O_3$ and $ZrO_2$ without $CeO_2$; the content of the element Y in the positive electrode material is 200 to 2000 ppm, the content of the element La in the positive electrode material is 20 to 3000 ppm, the content of the element Zr in the positive electrode material is 20 to 2500 ppm.

8. A positive electrode, comprising:
   a positive current collector; and
   a positive electrode material arranged on the positive current collector;
   wherein the positive electrode material comprising:
   a substrate material; and
   a coating material formed on at least one part of a surface of the substrate material;
   the general formula of the substrate material being $Li_xCo_yM_{1-y}O_2$, wherein $1.0 \leq x \leq 1.2$, $0.8 \leq y \leq 1.0$ and M is at least one selected from the group consisting of Mg, Ti, Al, Zr, Ni, Mn;
   the coating material includes $Y_2O_3$ and at least two selected from the group consisting of $La_2O_3$, $ZrO_2$ and $CeO_2$,
   wherein a solid solution is arranged between the substrate material and the coating material.

9. The positive electrode according to claim 8, wherein the general formula of the substrate material is $LiCo_yM_{1-y}O_2$, wherein $0.8 \leq y < 1.0$ and M is at least one selected from the group consisting of Mg, Ti, Al, Zr and Ni.

10. The positive electrode according to claim 8, wherein the content of the element Y in the positive electrode material is 200 to 2000 ppm; the content of the element La in the positive electrode material is 0 to 3000 ppm; the content of the element Ce in the positive electrode material is 0 to 2000 ppm; the content of the element Zr in the positive electrode material is 0 to 2500 ppm.

11. The positive electrode according to claim 10, wherein the content of the element Y in the positive electrode material is 200 to 2000 ppm, the content of the element La in the positive electrode material is 20 to 3000 ppm, the content of the element Zr in the positive electrode material is 20 to 2500 ppm.

12. The positive electrode according to claim 8, wherein the coating material comprises $Y_2O_3$, $La_2O_3$ and $ZrO_2$.

13. The positive electrode according to claim 8, wherein the coating material comprises $Y_2O_3$, $La_2O_3$, $ZrO_2$ and $CeO_2$.

14. The positive electrode according to claim 8, wherein the coating material comprises $Y_2O_3$, $La_2O_3$ and $ZrO_2$ without $CeO_2$; the content of the element Y in the positive electrode material is 200 to 2000 ppm, the content of the element La in the positive electrode material is 20 to 3000 ppm, the content of the element Zr in the positive electrode material is 20 to 2500 ppm.

15. A lithium-ion battery, characterized by comprising the positive electrode according to claim 8.

* * * * *